United States Patent
Carlyle

(10) Patent No.: US 10,380,123 B2
(45) Date of Patent: Aug. 13, 2019

(54) STORE-SPECIFIC RECOMMENDATION ENGINE

(71) Applicant: Cloudtags, Inc., Atlanta, GA (US)

(72) Inventor: Eric Carlyle, Atlanta, GA (US)

(73) Assignee: Cloudtags, Inc., Atlanta, GA (US)

(*) Notice: Subject to any disclaimer, the term of this patent is extended or adjusted under 35 U.S.C. 154(b) by 513 days.

(21) Appl. No.: 15/262,002

(22) Filed: Sep. 11, 2016

(65) Prior Publication Data

US 2018/0075035 A1 Mar. 15, 2018

(51) Int. Cl.
| | | |
|---|---|---|
| *G06F 16/00* | (2019.01) | |
| *G06F 16/2457* | (2019.01) | |
| *G06Q 30/06* | (2012.01) | |
| *G06F 16/21* | (2019.01) | |
| *G06F 16/901* | (2019.01) | |
| *G06F 16/332* | (2019.01) | |
| *G06F 16/9032* | (2019.01) | |

(52) U.S. Cl.
CPC ...... *G06F 16/24578* (2019.01); *G06F 16/212* (2019.01); *G06F 16/3322* (2019.01); *G06F 16/9024* (2019.01); *G06F 16/90324* (2019.01); *G06Q 30/0631* (2013.01)

(58) Field of Classification Search
USPC .......................................................... 707/767
See application file for complete search history.

(56) References Cited

U.S. PATENT DOCUMENTS

| | | | | |
|---|---|---|---|---|
| 8,015,140 B2 * | 9/2011 | Kumar | ................ | G06Q 10/04 |
| | | | | 706/46 |
| 9,495,714 B2 * | 11/2016 | Bush | ................ | G06Q 50/01 |
| 2015/0149484 A1 * | 5/2015 | Kelley | ................ | G06Q 30/0631 |
| | | | | 707/748 |

* cited by examiner

*Primary Examiner* — Thu Nguyet T Le
(74) *Attorney, Agent, or Firm* — Clayton, McKay & Bailey, PC

(57) ABSTRACT

Systems herein allow a store to make store-specific product recommendations to customers who are in the store. The system builds a graph database of relationships between products based on sales data, such as invoices. The relationships are stored as edges with store-specific edge values. Store similarities are determined by a genetic algorithm that creates a candidate solution that includes an array of weights for each store, representing that store's similarity with the other stores. The system includes a recommendation engine that receives a recommendation request identifying a target store and a target product. Based on that, the corresponding edges are retrieved, the edge values are weighted based on the candidate solution, and the highest-weighted connected products are recommended.

20 Claims, 6 Drawing Sheets

| Store ID | Invoice ID | Sale Date | Item SKU | Quantity | Customer ID |
|---|---|---|---|---|---|
| 1 | 1 | 1/1/16 | SKU1 | 1 | ABC |
| 1 | 1 | 1/1/16 | SKU2 | 2 | ABC |
| 2 | 2 | 1/2/16 | SKU3 | 1 | ABD |
| 2 | 2 | 1/2/16 | SKU1 | 1 | ABD |
| 1 | 3 | 1/2/16 | SKU4 | 4 | ABE |

# STORE-SPECIFIC RECOMMENDATION ENGINE

BACKGROUND

Retailers always look for ways to better serve their customers. One of a retailer's the top priorities is to ensure their customers can find the products to fit their wants and needs. In a typical situation, store employees will engage the customer to determine what types of products the customer is looking for. Based on the interaction, the employee can recommend an item that seems to fit the customer's description.

However, customers often are unable to fully articulate the information that the retailer needs to best help the customer. The retailer might not have a large enough employee base to help all the customers in the store. Even if they did, it is likely that the employees will not know every product to the degree needed for the most comprehensive recommendations.

Technological assistance for in-store recommendations is limited. Stores implement loyalty and rewards programs in an effort to track what a customer has purchased. But that technology does not provide real-time product recommendations to a customer when the customer is in the store. Instead, it is used for coupon campaigns and other programs unrelated to in-store engagement.

Meanwhile, Internet technology has developed for web-based product recommendation. This technology usually tracks which products a user has viewed in a browser. Based on that information, recommendations are placed in front of the user as the user browses the web. Shopping web pages can similarly display products based on browsing history.

But this technology does not account for an in-store experience. It does not recommend products the user can buy while they are at the store. And because the technology is largely decoupled from the point of sales, a user is often inundated with advertisements for products they have already purchased or decided not to purchase. As a result, this sort of Internet recommendation technology is not useful for making product recommendations within specific stores. Current technologies do not effectively link the in-store user experience to the online shopping experience.

Most fundamentally, current systems are not capable of recommendations that are unique to the particular store. Unlike a website that is accessed from all over the country or the world, each physical store has specific considerations related to its local customer base. These include product placement and availability, which can be based on geographically-relevant attributes. Current recommendation technology does not address this reality. Instead, product recommendation technology so far has largely remained limited to Internet shopping recommendations.

As a result, a need exists for a store-specific recommendation engine.

SUMMARY

An example system includes a store-specific recommendation engine that uses sales data (e.g., invoices) and a product feed (e.g., inventory data). Using this information, the system trains a model graph database that establishes store-specific relationships between products. Then, based on a recommendation request for a particular store that identifies a target product, the recommendation engine delivers a recommendation. The recommendation can be one of a set of recommendations delivered in response to the recommendation request.

Based on a product feed and the line item data, the engine can build a graph database of related products. The product feed can include a product identifier and an available quantity of the corresponding product at a first store. The server can also receive line item sales data that includes a customer order from a point of sale system. The customer order can include an invoice identifier, a store identifier, a customer identifier, the product identifier, a date, and a purchased quantity.

The graph database can have multiple nodes, each node representing a product. The node can have attributes, one of which can be the product identifier. The recommendation engine can also build edges between the nodes based on products that are purchased together at the store. Edges can be store-specific and associated with different store identifiers. For example, edges can be created for each store to track the different product relationships for the different stores. Edges can be created and given weight values based on common properties that link the product nodes. For example, products associated with a common invoice identifier can be related since they are purchased together. Other commonalities could include a common user (i.e., customer) identifier associated with two products, indicating a customer is interested in or has purchased both.

This can result in a graph of product nodes with store-specific edges. These edges can have first weights that represent the strength of product correlation between two nodes at that particular store. This can allow the relationship between products to be weighted differently for different stores.

The recommendation engine can determine which stores are most similar to a requesting store. This can allow the recommendation engine to more-accurately use edges from other stores in determining a product recommendation for the requesting store. To do this, a genetic algorithm can be used to determine second weights that represent commonality between stores. The genetic algorithm can start with a set of randomly generated candidates. Each candidate acts as a gene strand, and each gene is a value between 0 and 1 that represents the similarity of a store to the requesting store. In this way, each gene is associated with a store identifier. The candidates are analyzed with a test function, which can be a Laplacian eigenvalue of centrality. The top candidates (above a threshold) are kept, and the others are eliminated. A crossover function can then be applied to the top candidates, and the process can repeat iteratively until a top candidate is reached.

The genetic algorithm can iteratively determine a set of second weights that represent how similar product relationships are between the requesting store and other stores. The top candidate set of second weights can be determined by comparing randomized candidate solutions against a set of hold out transactions at the first store, such as invoices, and the other stores. The invoices used as hold out transactions can be based on invoice date. When there is sufficient sales data, invoice date can act as a threshold cutoff for hold out transactions.

In one example, the genetic algorithm determines a set of candidate solutions by maximizing a sum of centrality with the set of holdout transactions, such as a set of invoice data. The candidate solutions are then used in a subsequent iteration of the genetic algorithm. The algorithm can repeat until terminated based on a maximum number of generations or a threshold fitness level (e.g., commonality) has been exceeded.

Each of the candidate solutions can be represented as an array of numbers that represent similarities between the target store and each other store. In one example, the candidate array can represent a numeric weight from 0 to 1 for each store identifier in the graph database.

A fitness function can be used for evaluating the candidate solutions for a target store (i.e., the requesting store). The fitness function can be the observed Laplacian eigenvalue centrality of any product identifier within an invoice. The algorithm can use a subset of first and second graph connections to other product identifiers within the invoice. The fitness function can be the mean observed centrality of the set of recommendations for the hold out transaction invoices from the store. In one example, only the top 40% of candidate solutions are retained based on the fitness function. Then the process is repeated with additional invoice data until a set of product relationships occur commonly enough to exceed a threshold.

The candidate solution can be scored against sales data, such as by determining which stores sold particular product combinations. The candidate solutions can be reduced based on which candidates have the highest scores. Then, the recommendation engine can perform crossover, which can include randomly swapping upper and lower portions of candidate solution pairs until all of the reduced candidate population is used. The training process can repeat for additional generational advances by increasing the reduced candidate population through adding randomly initiated solutions and again executing the other stages. Generational advances can be done for a set number of iterations or until the reduced candidate population is homogenous. Homogeneity can be measured by exceeding a specified mean correlation coefficient between arrays of the reduced candidate solutions. The remaining one or more reduced candidates is considered a top candidate. At least one top candidate is stored in graph database in relation to the target store. Based on the sales data (e.g., invoice) connection between the candidates, the weights of the graph database can be updated. This training process can be repeated for each different store identifier.

Based on the training, the recommendation engine can make product recommendations. The recommendation engine can receive a recommendation request that includes a target store and a target product (or multiple target products). The target products can be matched to product identifiers. The request can originate from at a store device or a user device based on one or more target products the user is interested in. The product can be selected at the store device, such as based on a product the user has inquired about. Alternatively, the target product can be identified based on information from the user device, such as browsing history of the user or in-store interactions.

Using the store identifier, the recommendation engine can apply the weights of the top candidate solution for that store to the edges of the product graph. For example, the first weights of the edges can be adjusted based on the second weights of the candidate solution so that product correlations in other stores are more accurately weighted for use at the target store.

Using the product identifier from the recommendation request, the recommendation can retrieve other product nodes that are related to the product identifier in the graph database. The product nodes can be screened based on edge value, resulting in a set of top product candidates. The top product candidates can be culled based on sales data (e.g., items already purchased) and the product feed (e.g., inventory data). This can result in a remaining list of products that are both recommended and available at the store. At least one of the remaining product candidates can be sent to the store device or user device for presentation to the user.

Because the edge weights are adjusted based on the second weights of the candidate solution from the genetic algorithm, an element of randomness is introduced. The top-weighted edges can differ based on the second weights, resulting in different recommendations that are still relevant at the target store.

It is to be understood that both the foregoing general description and the following detailed description are exemplary and explanatory only and are not restrictive of the examples, as claimed.

DESCRIPTION OF THE EXAMPLES

Figure 1:
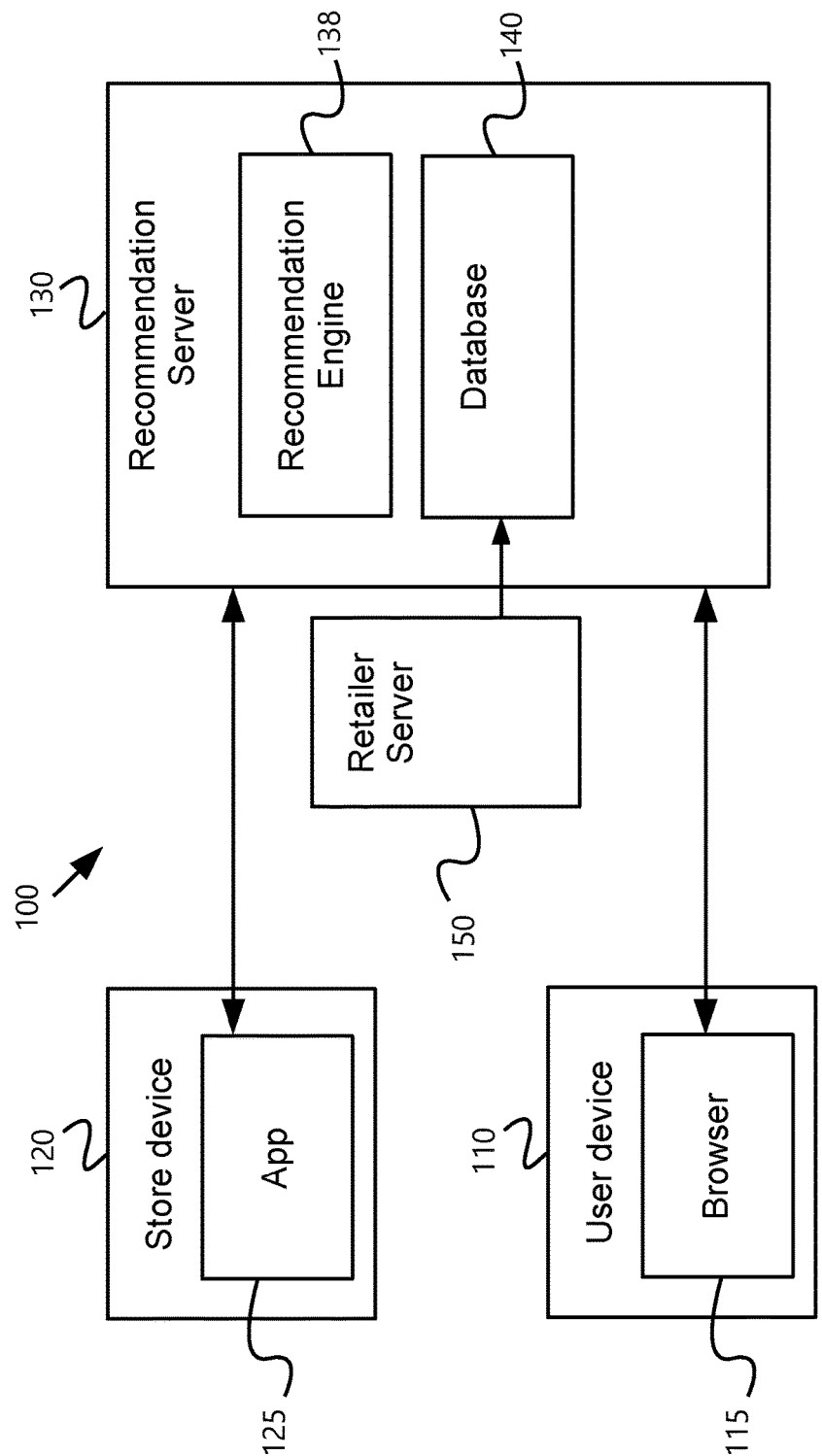
FIG. 1 is an exemplary illustration of system components.

Reference will now be made in detail to the present examples, including examples illustrated in the accompanying drawings. Wherever possible, the same reference numbers will be used throughout the drawings to refer to the same or like parts.

Examples described here include systems for determining which products within a physical store to recommend to a user. The system can include a recommendation engine that executes on a server. The recommendation engine can receive both sales information and product inventory information from retailers. The recommendation engine can utilize this information to build a graph of related products. Each unique product can be a node, and edges between the nodes can be store-specific, indicating how strongly the products correlate for a particular store. In this way, two nodes can have multiple edges between them with different values for different stores. The values can be first weights that are used for ranking product recommendations at specific stores. These first weights can be determined based on store invoices and other store attributes, such as geographic location. The first weights can range from 0 to 1 based on the relationship between the products at the store represented by the edge. Because product relationships can vary from store to store, the edges between the same two products can have different first weights for different stores.

An iterative genetic algorithm can be used to determine how relevant a second store's edges are in determining a recommendation for a first (e.g., target) store. The genetic algorithm can generate a candidate solution of second weights that represent the similarity of the other stores to the first store, including the second store. To do this, the genetic algorithm can maximize the sum of centrality for a set of second weights based on store transactions in the graph database. The genetic algorithm can start with a collection of randomly generated arrays, where each number in the array represents similarity with a different store identifier. Through an iterative process of crossover and candidate elimination that can span for levels (i.e., generations), a top candidate solution can be identified. The top candidate solution can represent the highest centrality out of the sample data. It can contain second weights between 0 and 1 to represent the similarity of the first store to every other store whose edges will be used in determining a product recommendation. Strongly related stores can have a value closer to 1, while weaker relationships carry a value closer to 0. The top candidate solution can be stored at the recommendation server in connection with the store identifier for the first store.

A server can utilize the top candidate solution and the graph database in providing product recommendations. In one example, the server receives a recommendation request that includes a store identifier and at least one considered product. These are the target store and target product(s), respectively. Using the store identifier of the target store, the corresponding top candidate solution can be retrieved. The edges of the graph database that are connected to the target product can also be retrieved. The second weights of the top candidate solution can be applied to the first weights of the retrieved edges to scale the value of the edges in accordance with their relevance to the target store. The recommendation can remove the considered product, any additional purchased products, and products not in inventory based on the product feed from the top product candidates.

The remaining products can be ranked based on the scaled edges. The recommendation engine can complete the recommendation by returning at least one remaining top-ranked products to the requestor. In one example, the recommendation request includes a number of recommendations requested. The recommendation engine can provide that number of top product candidates in response.

FIG. 1 illustrates an exemplary system 100 for store-specific product recommendations. The system can utilize a recommendation server 130 to provide in-store product recommendations based on the store's inventory and products receiving interest from a customer. Rather than relying solely on a store clerk or other store agent to point a customer to relevant alternative or additional products, optimal recommendations can be made by a recommendation engine 138. The recommendation engine 138 can execute at the recommendation server 130. In another example, the recommendation engine 138 can execute at one or more servers that are separate from the recommendation server 130.

In one example, a store agent can assist a customer by reporting one or more products that the customer is interested in to the recommendation server 130. In one example, the store agent can use a store device 120, such as a tablet, phone, or register, to identify products relevant to the customer. An application 125 can execute on the store device 120 for reporting products that the user is interested in to the recommendation server 130. Based on those products and the store to which the store agent or store device 120 is assigned, the recommendation engine 138 can recommend additional products for the customer to review. The application can report a store identifier associate with the store to the recommendation server 130 as part of the recommendation request. The store identifier can be stored locally in one example as part of an agent profile of the store agent.

In one example, the application 125 is a browser that executes on the store device 120. The store agent can log into a website associated with the store. The website can be part of a retailer server 150. The retailer server 150 can send the recommendation requests to the recommendation server 130 based on inputs by the store agent at the website. Additionally, the retailer server 150 can send a store identifier to the recommendation engine 138 as part of the recommendation request.

In one example, the customer can operate a user device 110, such as the customer's personal phone to retrieve information about a product. The user can go to a uniform resource locator ("URL") associated with the store. The website at that location can determine the user is at the physical store. For example, the URL can be specific to the store. When the user goes to the URL, the website can automatically determine which store identifier to associate with the user. For example, a first URL can indicate a first store identifier and a second URL can indicate a second store identifier. In another example, the website can request access to the user's location. If the user grants access, the website can determine which store identifier to associate with the user.

Because the user device 110 is communicating with the retailer server 150, the retailer server 150 can access a cookie on the user device 110, in an example. The cookie can be a first party cookie. The cookie can track products that the user has reviewed at the store website and on other websites associated with the retailer. In one example, the recommendation server 130 can receive product information from the cookie. The product information can be used to identify a target product for use as an input to the recommendation engine.

Based on the target product(s) and the store identifier, the recommendation engine 138 can determine at least one candidate product to recommend to the user. The candidate product can be sent to either the store device 120 or the user device 110, depending on the example.

User device 110 and store device 120 can be any computing device, such as a cell phone, laptop, tablet, personal computer, workstation, television, or television receiver. Each can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

In one example, the recommendation server 130 is located remotely from the user device 110 and store device 120. This can allow the recommendation server 130 to collect information from multiple stores. Store information can be maintained in a database 140. Each store can have a unique store identifier. Related stores, such as different stores of the same retail company, can be grouped in an example. Stores can also be grouped by type in one example.

In one example, the recommendation engine 138 builds a graph database that is stored in database 140. The database 140 can be located at the recommendation server 130 or can execute on a different computing device. The database 140 can store information related to various stores, such as product inventory, invoices, products sold, and other information. The database 140 can also store user information to build a history of products that the user has viewed or inquired about in the past.

In one example, the information stored in the database 140 can be based on a sales information and product inventory information from the store. The recommendation server 130 can receive a product feed from a computing device associated with a retailer. In one example, a store device 120 associated with a first store send the product feed to the recommendation server 130. The product feed can indicate the quantity of the product that remains at the first store.

The recommendation server 130 can also receive line item data that includes a customer order from a point of sale system at the first store. The point of sale system can be the store device 120 in one example, and a different computing device in another example. The customer order can include an invoice identifier, a store identifier, a customer identifier, the product identifier, a date, and a purchased quantity.

Based on the product feed and the line item data, the recommendation server 130 can build a graph database 140. The graph database 140 can have a plurality of nodes that each represent one of a plurality of products. Each node can be associated with a unique product identifier. The product identifier can be a stock keeping unit ("SKU") in one example. However, the product identifier is not limited to a particular format and can be any unique identifier, certificate, or code.

The database 140 can form edges that represent relationships between the product nodes. Edges can have weight values that represent how strongly the products are associated at a particular store. The weight value can based on occurrences of the product identifiers with common store identifiers, invoice identifiers, and the customer identifiers. Additionally, store identifiers for related stores can be used to determine edge weight for a particular store.

Because the edge weight value represents a relationship for a particular store, two product nodes can have multiple edges between them with different values, representing different relationship strengths for different stores. Edges can be created for each store in an example. The first store can have a first edge between two related products, and a second store can have a second edge between the same two products. But the first and second edges can be weighted differently based on the relative strength of relationship between the two products at the first and second stores. Additionally, some product pairs might not have edge relationships for all stores. This can be the case when a second product is not sold at a first store but is sold at a second store.

The recommendation engine 138 can adjust the weight values of the edges based on a genetic algorithm. The genetic algorithm can determine similarities between stores regarding which products are sold together. This can allow the genetic algorithm to adjust weight values of the edges such that similar stores are more highly valued and dissimilar stores are less highly valued. Then the recommendation engine can use all edges from target product(s) to determine a product recommendation for the target store.

The recommendation server 130 can include one or more servers. Each server can include one or more processors that execute instructions stored on a non-transitory, computer-readable medium. The recommendation server 130 can include any number of servers and processors.

The user devices 110 and 111 and recommendation server 130 can each utilize one or more processors. The term "processor," as generally used herein, can refer to any logic processing unit, such as one or more central processing units ("CPUs"), digital signal processors ("DSPs"), application specific integrated circuits ("ASICs"), field programmable gate arrays ("FPGAs"), and similar devices. The processor can include one or more processors configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

The user devices 110 and 111 and recommendation server 130 can also include an I/O module, such as a console with an integrated keyboard and mouse to allow a user to input parameters associated with system 100. An I/O module can also include a display including a GUI for outputting information on a screen.

Figure 2A:
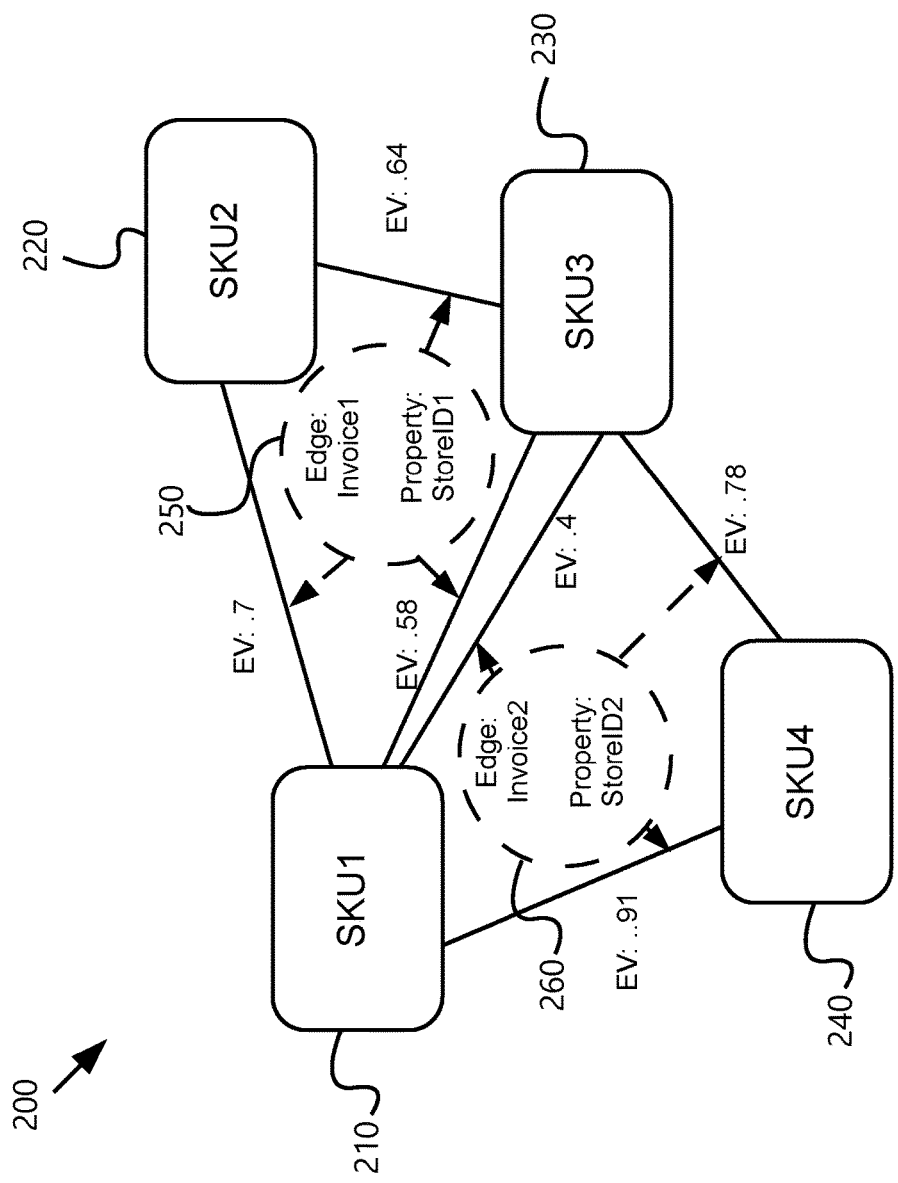
FIG. 2A is an exemplary graph of relationships used in a genetic algorithm.

FIG. 2A is an exemplary illustration of a graph database 200 relationships. In this example, four nodes 210, 220, 230, and 240 are pictured. Each node 210, 220, 230, and 240 is associated with a product. In this example, a first node 210 is associated with a first SKU, a second node 220 is associated with a second SKU, a third node 230 is associated with a third SKU, and a fourth node 240 is associated with a fourth SKU.

The graph database 200 can represent relationships between products for a first store with a first set of edges 250. The edges 250 can be based on invoices from the first store. In this example, the edges 250 form associations between the first and second nodes 210 and 220, second and third nodes 220 and 230, and first and third nodes 210 and 230.

In one example, the recommendation engine 138 builds the edges 250 based on the products being purchased together, as indicated by a first invoice. For example, the first invoice can include a store identifier that is associated with the first store. The first invoice can also include product identifiers for the first, second, and third products 210, 220, and 230, indicating that a customer purchased the three products together. In another example, edges can be formed based on a different relationship, such as related products by user or by date range.

A separate set of edges 260 can be created for a second store. This second set of edges 260 represent products that are together in an invoice from a second store, and can differ from the first edges 250. For example, an invoice associated with the second store can include the first, third, and fourth products 210, 230, and 240.

Figure 2B:
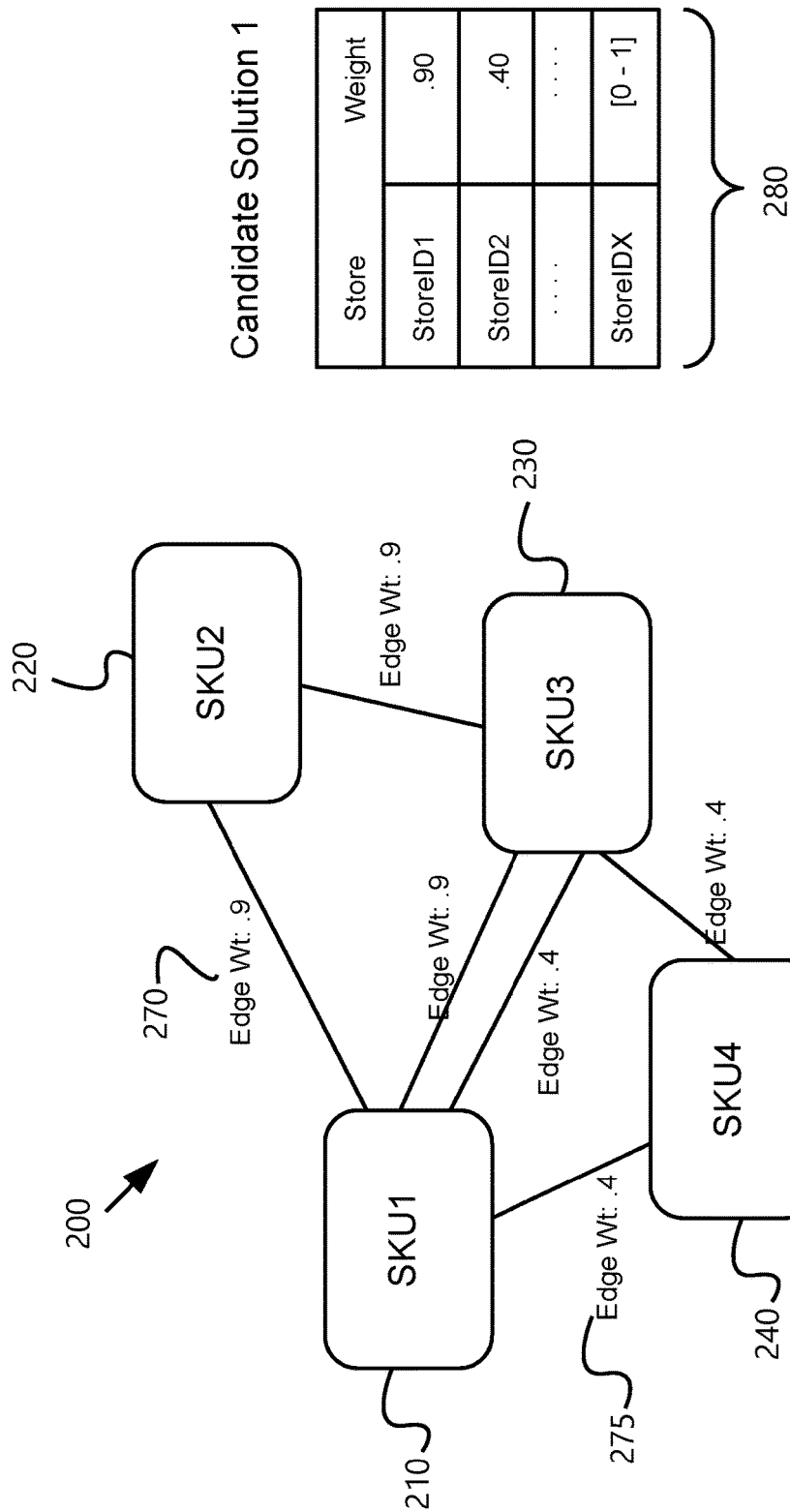
FIG. 2B is an exemplary graph of relationships used in a genetic algorithm.

As shown in FIG. 2B, each edge in the graph database 200 can be impacted by a second weight value 270, 275. The second weight value can be between 0 and 1 based on the similarity of the target store to the other stores, with 0 indicating very little or no relationship and 1 indicating a very strong relationship. In this example, the candidate solution 280 includes a second weight of 0.90 for a first store identifier, and a second weight of 0.40 for a second store identifier. The candidate solution 280 can be an array of numbers, which each value in the array corresponding to a different store identifier.

The illustration of FIG. 2B can represent a first candidate solution 280 that is one of many candidate solutions. The first candidate solution 280 can be compared against the other candidates that are generated iteratively based on other store data. The other candidates can include different edges with different weight values. The top candidates can continue to crossover or otherwise mate until a threshold commonality between candidates is reached. The crossover point for swapping values between candidates can be randomly selected. In one example, mutation is used instead of crossover. In that example, the parent candidates are mutated by changing one or more values within the candidate to produce a new child candidate.

At each iteration, the resulting candidates above a threshold commonality are retained and the others are eliminated.

The threshold can be 60 percent in one example. A new set of randomly generated candidates are then added and the process repeats. Once a certain percentage of the candidate solutions are common, the algorithm iterations can end and the common solution is selected as the top candidate solution 280.

When the top candidate solution 280 is determined by the genetic algorithm, it 280 can be stored in memory a the recommendation server 130. Then, when a recommendation request is received for the target store, the associated candidate solution 280 for that target store is retrieved. The weights 270, 275 of the top candidate solution 280 can be applied to the edge values (i.e. first weights) linked to the target product in the graph database 200.

Applying weights of the top candidate solution 280 to edge values can be explained with regard to the example of FIGS. 2A and 2B. In this example, a second weight 270 value of 0.9 is applied to the first set of edges 250, and a second weight 275 of 0.4 is applied to edges 260. Applying the weights 270, 275 to the edge 260, 265 values can include multiplying the edge 260 value by the weight 270. As shown in FIG. 2A, the edges 260 can have a first edge value of 0.91, a second edge value of 0.78, and a third edge value of 0.4. These edge values represent the connectedness of SKU1, SKU3, and SKU4 at StoreID2. The candidate solution 280 has a weight of 0.40 for StoreID2 relative to the target store of the recommendation request. To apply the weight, the edge values of edges 260 can be multiplied by 0.40 in one example, yielding weighted values of 0.364, 0.312, and 0.16. Conversely, the weight of 0.9 for StoreID1 indicates that StoreID1 is more similar to the target store. The edges 250 of StoreID1 can therefore be multiplied by 0.9, resulting in 0.63, 0.576, and 0.522.

As a result, the edges 250 of StoreID1 may be more heavily influential in picking recommended products for the target store than the edges 260 of StoreID2. If the target product is SKU1, in this example the recommended products can include SKU3. SKU3 has a total weighted edge value of 0.682, calculated from (0.58)*(0.90)+(0.40)(*0.40). However, the next recommended product would be SKU2 (with a weighted edge value of 0.63. This is the case even though SKU1 is more strongly associated with SKU4 at StoreID2 than SKU1 is associated with SKU2 at StoreID1. The weighting of the genetic algorithm can help tailor a recommended product in a way that would be unexpected and more accurate for the target store than relying on the graph database 200 alone.

Although the graph database 200 of FIG. 2A is simplified for explanation, with only four products and two stores, much more complex graph databases 200 are possible. Thousands of products and stores can be mapped with edges and nodes in this manner. The edge values for two products at a single store can be based on the propensity for the two products to be purchased together at that store. This can be calculated based on line item sales data for that store, which can include invoices that are more recent than a threshold past date.

Figure 2C:
FIG. 2C is an exemplary line item sales data feed.

Line item sales data associated with the example of FIGS. 2A and 2B is shown in FIG. 2C. Table 290 represents line item sales data. Any or all of the columns in the table 290 can act as indexes. The first column, Store ID, can be a store identifier that indicates which store associated with the sales data. Using the store identifier, the recommendation server 130 can retrieve other information about the store. For example, a store table can include location information for the store. It can also include a store group identifier. Stores can be grouped according to common ownership in one example. This can allow the system to build recommendations based on other stores of the same franchise.

The line item sales data can also include an invoice identifier. In one example, invoices received from stores are given unique invoice identifiers. Tracking an invoice can allow the system to determine which products have been purchased together. When multiple products are commonly found in the same invoice, this can show that a relationship between the products exists. This can be valuable in determining which products to recommend based on a target product.

The line item data can also include a sale date. This can indicate when the sale took place. In one example, only sales meeting a threshold recency are used by the recommendation server 130 in building the edges 250, 260 and calculating the edge values of the graph database 200. Because relationships between products can change over time, creating edge relationships based on sale date ranges can make the product relationships of the graph database 200 more accurate.

Continuing with FIG. 2C, the Item SKU can indicate which product was sold. The Item SKU can serve as a node in one example. By associated unique product identifiers with nodes, it is possible for the graph database 200 to determine edge relationships based on the other data that is common to different products.

The product identifiers can also be linked to a product feed in one example. The product feed can include a list of available products at a store. In one example, the database 140 collects information regarding available products. Participating stores can upload product feed information to the database 140 daily, such as from retailer server 150. The retailer server 150 can contact the recommendations server 130 using an application programming interface ("API") call or a file transfer protocol ("FTP") transfer. Alternatively, the recommendation server 130 can contact the retailer server 150 using an API call, and receive the most recent product feed.

The information in the product feed can be used to ensure that only available products are recommended at a store in one example. The recommendations can be based on which products are in stock at the particular store or at the company level (e.g., in a warehouse or at a different one of the company's stores).

The line item sales data can also include a quantity of items sold. The quantity can be used to add additional weight to edges from a product in one example. For example, if a customer tends to buy multiple of an item, the edge value can be slightly increased based on the average quantity.

The line item sales data can further include a customer identifier. This can indicate which customer purchased the item. This can allow the system to determine relationships between products based on separate purchases by the same customer. A new set of edges can be created based on this relationship.

In one example, line item sales data is received daily into the recommendation server 130, such as from the retailer server 150. In another example, line item data can be received at the recommendation server in real-time, such as when a store device 120 completes a sale. The recommendation server 130 and retailer server 150 can communicate through API calls in an example. This can allow the retailer server 150 or store device 120 to upload the line item sales data to the recommendation server 130 in one example. In another example, the recommendation server 130 can request the line item sales data from the retailer server 150.

In one example, the recommendation engine 138 utilizes a genetic algorithm to train the graph database 200. The genetic algorithm attempts to maximize a sum of centrality of a set of recommendations based on the line item sales data. The maximization is accomplished by adjusting weight values applied to the store identifier edges within a training dataset. The training dataset can include a subset of the total line item sales data that is available.

The genetic algorithm can utilize a genetic representation of each candidate solution. This can be an array of numbers in one example, representing potential weights between a target store and other stores. The initial set of candidate arrays can be randomly generated in an example.

The genetic algorithm can also utilize a fitness function to evaluate the candidate solutions. The candidate solutions that pass the fitness function can be retained, while the rest are thrown out. In one example, the fitness function includes scoring each candidate array against a sample of invoices (e.g., line item sales data). The fitness function can test the arrays against relationships in the sample line item sales data. For example, one fitness function can be based on products that are found together in invoices for each store. Another fitness function can include comparing against products bought by the same customer within a threshold number of days apart. In one example, the fitness function includes preserves the top 40% most common relationships.

The retained candidate solutions can then be manipulated according to the genetic algorithm. In one example, a crossover function is used. Crossover can include swapping the upper and lower portions of the candidate solutions. Crossover can be repeated until all of the candidate solutions have been changed. Crossover can be randomized such that the point at which crossover occurs along the candidate array changes. For example, if there are 2000 stores in the database, the candidate solutions can have an array size of 2000. The crossover point along the array can be at 1900 in one iteration of the genetic algorithm, and then change to 1200 in another iteration. Alternatively, each part of candidate solutions that swaps values during crossover can have a randomized crossover point.

Additional solutions can be randomly generated and the process can repeat for multiple iterations. The iterations can end after a maximum number of iterations is reached or when a maximum mean correlation coefficient is achieved between the candidate solutions.

In one example, the recommendation engine calculates the Laplacian eigenvalue of centrality of the retrieved edges. In one example, the recommendation engine 138 only keeps the candidate solutions that exceed a threshold value for the Laplacian eigenvalue. The recommendation engine 138 can then remove the other candidate solutions. The remaining candidate solutions can be supplemented with additional randomly generated candidate solutions and the process can repeat for another iteration.

When the candidate solutions reach a predetermined commonality or a max number of iterations has occurred, the top candidate solution can be stored in association with the store identifier for which it was generated.

This process can be carried out for each store in the database such that each store has a top candidate solution that contains relative weights for all the stores. The top candidate solutions for each store (i.e., retailer) are then stored in database 140.

The graph database 200 and stored top candidate solutions allow the recommendation engine 138 to make product recommendations. A recommendation request can originate from a target store, and identify the target store and at least one target product. The target products can be products that the user has browsed at the store or online, or otherwise indicated interest in to a store agent. The target store can be represented by a store identifier and the target product(s) can be represented by product identifiers.

Using a target product identifier, the recommendation engine 138 can locate the corresponding product node in the graph database 140. The recommendation engine 138 can retrieve the edges associated with the store identifier that are connected to the identified product node. The edges are connected to additional connected products that are candidates for recommendation. The edge values of the edges can be manipulated by the weight values of the top candidate solution that corresponds to the target store. The resulting weighted edge values can be used to determine which of those products to recommend.

The recommendation engine 138 can compare the subset of connected products to the product feed for the store, in one example. The product feed can indicate all products that are active and potentially available through the store. If a product is not active, then it is removed from the subset of connected products.

Additionally, active products that are not in inventory can also be removed from the connected products. The decision of whether to remove active but currently unavailable products can be based on a retailer setting. This can allow the retailer to control whether to recommend unavailable products. In one example, the target product is compared against the product feed, which can indicate unit availability. The inventory can be based on the specific store's inventory in one example. In another example, company-wide inventory is considered. Based on the retailer setting, products that are not in inventory can be removed from the connected products.

The recommendation engine 138 can sort the remaining connected products based on the centrality measurement, from highest to lowest. The highest-sorted products can be returned from the recommendation engine 138 to the requestor (e.g., the store device 120 or the user device 110).

The recommendation request can specify a quantity of products to recommend in one example. For example, based on a target product, the app 125 or retailer web site can be configured to request three additional recommendations. In that example, the recommendation engine 138 can return the top three rated connected products.

The recommendation request can also include more than one target product in an example. For example, the user might have requested more information on three different products. In one example, the user can scan tags for those products on a shelf at the store, such as by placing their user device 110 in proximity to a RFID tag. In another example, a store agent can manually enter the products that a customer has indicated interest in into the app 125 or website. Those multiple products can be target products in the recommendation request.

When the recommendation request includes multiple target products, the recommendation server 130 can retrieve the edges associated with each of the target products. The recommendation server 130 can also retrieve the top candidate solution for the target store. The weights can be applied to the edge values, and the resulting weighted edge values can be considered for each product. In one example, this includes summing all the weighted edge values for each product. This can favor recommendation of products that are strongly connected to multiple of the target products, based on the weights of stores with common sales patterns.

Figure 3:
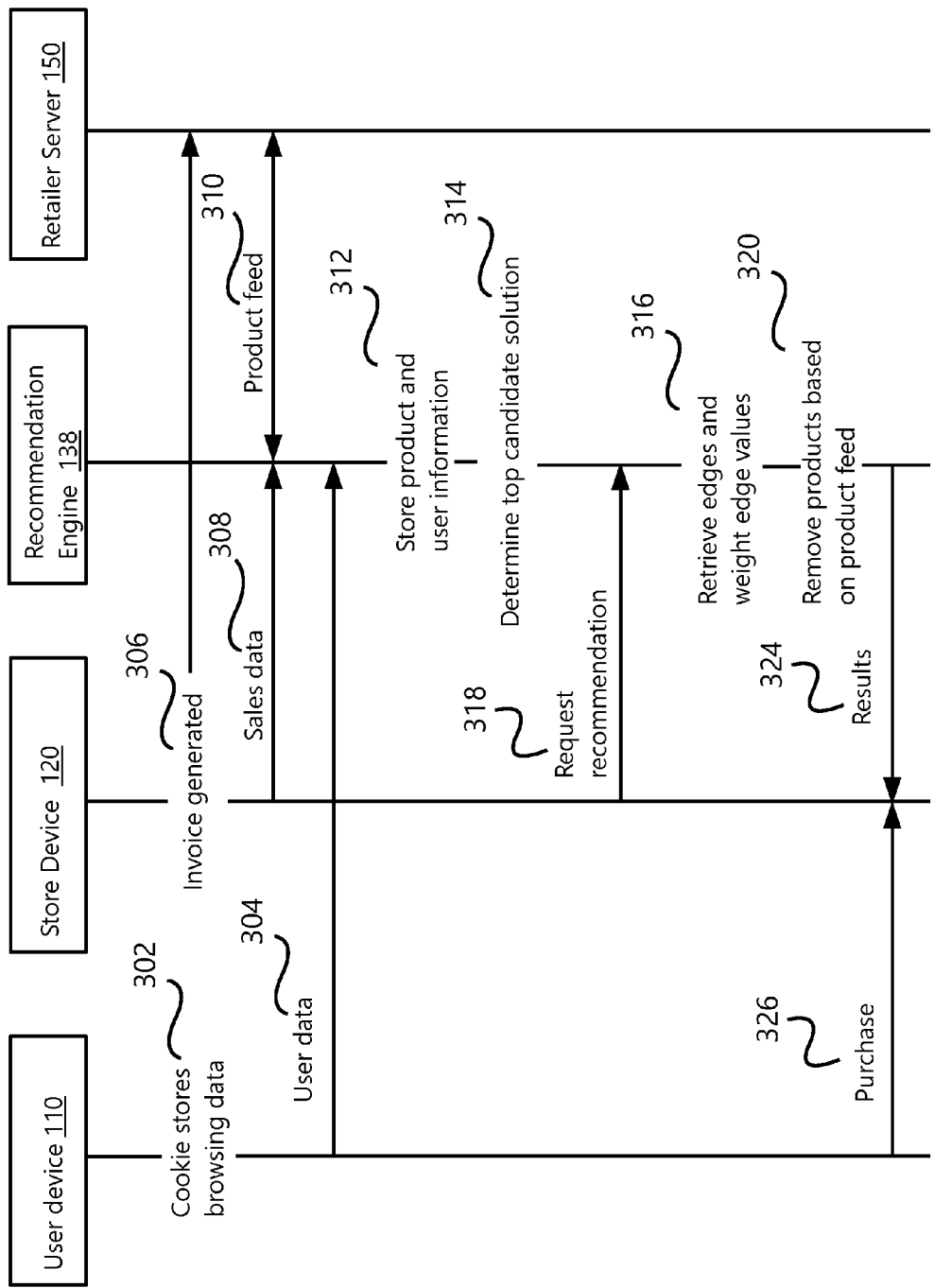
FIG. 3 is an exemplary flow chart of steps performed in a system.

FIG. 3 illustrates an example method performed by a system. At stage 302, the user device 110 can store browsing data in a cookie. The cookie can store product information for products browsed by the user on the user device 110. In one example, the customer is directed to a URL for the store based on an in-store activity. For example, to gain more information about a product in the store, the customer can scan a tag using the user device 110. The tag can direct the user device 110 to a URL associated with the store. In one example, the website is in communication with the recommendation engine 138.

The cookie contents can be accessed by the website and sent to the recommendation engine 138 at stage 304. The recommendation engine 138 can parse the cookie information to detect products. These products can be tied to product identifiers in the database 140 and entries linking the user to the products can be added to the graph database 140 at stage 312.

At stage 306, the store can generate an invoice. This can be done on the store device 120 in an example, such as by checking out a customer. In another example, product info is entered into the store device when a store agent identifies products that the customer is interested in. Both types of data can be sent to the recommendation engine at stage 308. In one example, the sales information sent to the recommendation engine 138 is line item sales data.

At stage 310, a retailer server 150 can send a product feed to the recommendation engine 138. This can be done nightly in one example. In another example, as product inventory is updated at the retailer server 150, updates are replicated to the recommendation engine 138. The retailer server 150 can be loaded with a public key used for communicating with the recommendation engine 138. The retailer server 150 can supply the key and make API calls to update the product feed at the recommendation engine 138.

At stage 312, the product, sales, and user information received from the user device 110, store device 120, and retailer server 150 are stored in a database 140. This information is used by the recommendation engine 138 to train a graph database having nodes that represent products. The edges between products can represent product associations for particular stores. Edge values can be calculated based on the frequency and strength of the association at the particular store.

For example, a subset of total invoices from a first store can be analyzed to graph each invoice, creating product nodes and edges between the nodes for that store. The most common edges are compiled to generate a value for an edge between those products. A value closer to 1 than to 0 can indicate a relatively more common relationship. This process can be repeated at various time intervals by graphing additional invoices and compiling the results.

At stage 314, recommendation engine 138 can execute a genetic algorithm to determine a top candidate solution for each store. The candidates can be arrays of numbers between 1 and 0 that represent similarities between a first store and other stores. Each number in the array can represent commonality of a particular store identifier. For example, the first cell in the array can represent the weight of a first store, and the $n^{th}$ cell in the array can represent the weight of the $n^{th}$ store.

At stage 318, the recommendation engine 138 can receive a recommendation request. The recommendation request can identify the store (with a store identifier) and target product(s) (with product identifier(s)). The recommendation request can also identify a number of recommendations that the recommendation server 130 should return.

At stage 316, the edges associated with the target product(s) are retrieved. The edge values are manipulated based on the weight values of the top candidate solution for the target store. The weighted edge values allow the recommendation engine 138 to rank the products for recommendation.

At stage 320, the recommendation engine 138 can eliminate products for recommendation. Products are removed based on active status, availability, and redundancy with the target products.

The top-ranked remaining products are used as the results 324. The number of resulting products 324 can be specified in the recommendation request 318. For example, if three product recommendations are requested, the top three remaining products are returned as the results 324. These resulting recommended products can be displayed at the requesting device 110 or 120. Those products can be purchased by the customer at stage 326.

Figure 4:
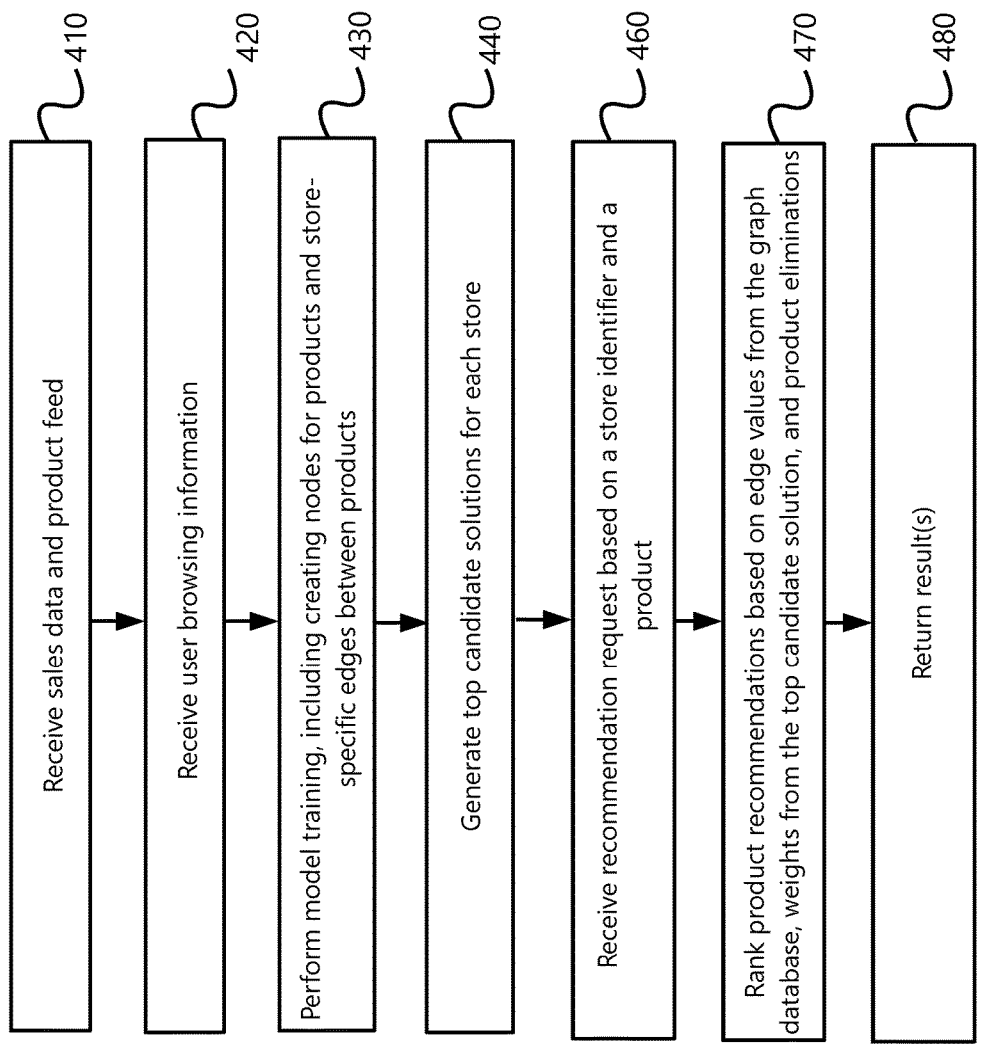
FIG. 4 is an exemplary flow chart of steps performed in a system.

FIG. 4 is an illustration of example stages performed in a system. At stage 410, the recommendation server 130 can receive sales data and a product feed. Optionally, user browsing information can be received at stage 420.

This information can be used to train a graph database at stage 430. Nodes can be created for each unique product in the product feed. Edges can be created between products based on sales data (e.g., products sold together in an invoice). Edges can be created separately for each store.

At stage 440, a genetic algorithm can create top candidate solutions for the stores. The top candidate solutions can be arrays of weights that represent how similar each store is to a target store.

At stage 460, the recommendation server 130 can receive recommendation request based on a store identifier and at least one product identifier. The request can come from a user device 110 or a store device 120. The request can also identify multiple target product identifiers and/or specify the desired number of results (i.e., recommended products).

At stage 470, the recommendation server 130 can rank the recommendations. To do this, the edges associated with the target product(s) are obtained. The edge values for each product are manipulated by the weights in the top candidate solution for the target store. The resulting weighted edge values can be summed for each store in an example. Additionally, products can be removed from the list of recommendation candidates based on inventory data at the target store, such as product status and availability at the store. The remaining top rated result(s) can be returned as product recommendation(s) to the requesting device 110 or 120 at stage 480.

Other examples of the disclosure will be apparent to those skilled in the art from consideration of the specification and practice of the examples disclosed herein. The examples are not limited to a particular genetic algorithm unless otherwise specified. Also, although stores are discussed as examples, the term "store" and "retailer" are not meant to be limiting.

Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A non-transitory, computer-readable medium containing instructions executed by at least one processor to perform stages for configuring user devices in a classroom, the stages comprising:
   receiving sales data and a product feed;
   building a graph database with nodes that represent products and edges that represent relationships between the products, wherein different edges are created for different stores, and the edges include edge values that indicate the strength of relationship between two products for the respective stores, wherein the edges associate with store identifiers;
   determining a top candidate solution with a genetic algorithm, the top candidate solution including weights that represent sales commonality of a first store relative to a plurality of other stores;
   receiving a product recommendation request from a computing device, the product recommendation request specifying a target store identifier and a target product identifier, wherein the target store identifier corresponds to the first store;
   identifying a first node associate with the target product identifier and retrieving the edges associated with the first node, the edges being associated with connected products;
   manipulating the edge values of the retrieved edges based on the weights of the top candidate solution, wherein the weights are applied to the edge values based on common store identifiers between the edge values and the weights;
   removing at least one of the connected products based on availability at a first store associated with the store identifier;
   ranking the connected products based on manipulated edge values; and
   returning a result that includes the top-ranked remaining connected product.

2. The non-transitory, computer-readable medium of claim 1, wherein the product recommendation request specifies a recommendation quantity, and a corresponding number of the top-ranked connected products are returned in the result based on ranking.

3. The non-transitory, computer-readable medium of claim 1, wherein the product recommendation request includes a plurality of target product identifiers, and wherein the edges associated with all of the target product identifiers are weighted based on the top candidate solution and used in determining the result.

4. The non-transitory, computer-readable medium of claim 1, wherein the genetic algorithm further includes:
   generating a random set of candidate solutions, each candidate solution including an array of values;
   determining the accuracy of each of the candidate solutions based on holdout sales transactions;
   removing a portion of the candidate solutions that do not meet an accuracy threshold;
   performing crossover on the remaining candidate solutions; and
   repeating the generating, determining, removing, and crossover steps until a threshold iteration maximum is reached or a threshold candidate solution commonality is reached.

5. The non-transitory, computer-readable medium of claim 4, wherein the threshold candidate solution commonality is based on calculating an Laplacian eigenvalue of centrality for the candidate solutions.

6. The non-transitory, computer-readable medium of claim 1, wherein building the graph database includes determining sales data meets a recency threshold before using it to create the edges.

7. The non-transitory, computer-readable medium of claim 1, wherein the top candidate solution is determined independently for each store that has an edge in the graph database, and each of the top candidate solutions has a same number of cells, with each cell corresponding to the same store identifier.

8. The non-transitory, computer-readable medium of claim 1, wherein at least one set of edges for each store is based on common products within an invoice.

9. A method for configuring user devices in a classroom, comprising:
   receiving sales data and a product feed;
   building a graph database with nodes that represent products and edges that represent relationships between the products, wherein different edges are created for different stores, and the edges include edge values that indicate the strength of relationship between two products for the respective stores, wherein the edges associate with store identifiers;
   determining a top candidate solution with a genetic algorithm, the top candidate solution including weights that represent sales commonality of a first store relative to a plurality of other stores;
   receiving a product recommendation request from a computing device, the product recommendation request specifying a target store identifier and a target product identifier, wherein the target store identifier corresponds to the first store;
   identifying a first node associate with the target product identifier and retrieving the edges associated with the first node, the edges being associated with connected products;
   manipulating the edge values of the retrieved edges based on the weights of the top candidate solution, wherein the weights are applied to the edge values based on common store identifiers between the edge values and the weights;
   removing at least one of the connected products based on availability at a first store associated with the store identifier;
   ranking the connected products based on manipulated edge values; and
   returning a result that includes the top-ranked remaining connected product.

10. The method of claim 9, wherein the product recommendation request specifies a recommendation quantity, and a corresponding number of the top-ranked connected products are returned in the result based on ranking.

11. The method of claim 9, wherein the product recommendation request includes a plurality of target product identifiers, and wherein the edges associated with all of the target product identifiers are weighted based on the top candidate solution and used in determining the result.

12. The method of claim 9, wherein the genetic algorithm further includes:
   generating a random set of candidate solutions, each candidate solution including an array of values;
   determining the accuracy of each of the candidate solutions based on holdout sales transactions;
   removing a portion of the candidate solutions that do not meet an accuracy threshold;
   performing crossover on the remaining candidate solutions; and repeating the generating, determining, removing, and crossover steps until a threshold iteration maximum is reached or a threshold candidate solution commonality is reached.

13. The method of claim 12, wherein the threshold candidate solution commonality is based on calculating an Laplacian eigenvalue of centrality for the candidate solutions.

14. The method of claim 9, wherein building the graph database includes determining sales data meets a recency threshold before using it to create the edges.

15. The method of claim 9, wherein the top candidate solution is determined independently for each store that has an edge in the graph database, and each of the top candidate solutions has a same number of cells, with each cell corresponding to the same store identifier.

16. The method of claim 9, wherein at least one set of edges for each store is based on common products within an invoice.

17. A system for making store-specific product recommendations, comprising:
    a recommendation server that receives a product recommendation request from a computing device, the product recommendation request specifying a store identifier and a target product identifier, wherein the recommendation server comprises a processor;
    a graph database with nodes that represent products and separate edges for different stores, wherein the edges include weight values that indicate the strength of relationship between two products for the respective stores, wherein the edges associate with store identifiers; and
    a recommendation engine that executes on the recommendation server, the recommendation engine performing stages comprising:
    building the graph database based on sales data and a product feed received by the recommendation server;
    determining a top candidate solution with a genetic algorithm, the top candidate solution including weights that represent sales commonality of a first store relative to a plurality of other stores;
    receiving the product recommendation request from the computing device, the product recommendation request specifying a target store identifier and a target product identifier, wherein the target store identifier corresponds to the first store;
    identifying a first node associate with the target product identifier and retrieving the edges associated with the first node, the edges being associated with connected products;
    manipulating the edge values of the retrieved edges based on the weights of the top candidate solution, wherein the weights are applied to the edge values based on common store identifiers between the edge values and the weights;
    removing at least one of the connected products based on availability at a first store associated with the store identifier;
    ranking the connected products based on manipulated edge values; and
    returning a result that includes the top-ranked remaining connected product.

18. The system of claim 17, wherein at least one of the edges is based on the target product and at least one of the connected products being together in at least one invoice.

19. The system of claim 17, wherein at least one of the edges is based on the target product and at least one of the connected products being purchased by a same user within a time period.

20. The system of claim 19, the stages further comprising:
    receiving product information from a cookie on a user device; and
    using the product information in building the graph database.

* * * * *